United States Patent [19]

Ennis

[11] 3,790,813

[45] Feb. 5, 1974

[54] FILM SWITCHING SYSTEM FOR MUTUALLY ISOLATED CIRCUITS

[75] Inventor: Thomas E. Ennis, Niles, Ill.

[73] Assignee: GTE Automatic Electric Laboratories Incorporated, Northlake, Ill.

[22] Filed: Nov. 30, 1972

[21] Appl. No.: 311,026

[52] U.S. Cl. ................ 307/115, 84/1.01, 179/90 K, 331/49, 340/171 PF

[51] Int. Cl. ................ H04g 1/45

[58] Field of Search ......... 179/90 K, 90 R; 307/115; 84/1.01; 338/22; 340/171 PF, 365 R, 351; 317/137; 331/49

[56] References Cited

UNITED STATES PATENTS

| | | | |
|---|---|---|---|
| 3,612,773 | 10/1971 | Riehm | 179/90 K |
| 3,541,515 | 11/1970 | Walter et al. | 317/137 X |
| 3,521,005 | 7/1970 | Dow et al. | 179/90 K |
| 3,505,461 | 4/1970 | Omura et al. | 84/1.01 |
| 3,424,870 | 1/1969 | Breeden et al. | 179/90 K |
| 2,501,172 | 3/1950 | Hammond et al. | 331/49 X |
| 2,274,199 | 2/1942 | Hammond | 84/1.01 |
| 1,326,727 | 12/1919 | Hammond | 340/171 PF |
| 1,311,384 | 7/1919 | Drew | 317/137 |

*Primary Examiner*—Robert K. Schaefer
*Assistant Examiner*—William J. Smith
*Attorney, Agent, or Firm*—Lester N. Arnold

[57] ABSTRACT

A switching system utilizing film switches permits selection of respective impedances in a plurality of mutually isolated circuits, particularly the selection of resistors in the frequency determining filters of a plurality of tone generators in a multifrequency dial signal generator for a telephone set. In one form of the invention, a group of film switches is associated with the frequency determining resistors of each tone generator. The heater element of a film switch from one group is placed in series with the heater element of a film switch from another group and connected to a source of power, as by operation of a single closure push button switch. The temperature-sensitive resistors of the respective film switches thereupon place the corresponding selected resistors in circuit, whereupon signals of selected predetermined frequencies are produced by the respective tone generators.

6 Claims, 5 Drawing Figures

FILM SWITCHING SYSTEM FOR MUTUALLY ISOLATED CIRCUITS

This invention relates generally to switching systems for selecting respective impedances in a plurality of mutually isolated circuits by the operation of a single closure switch to activate a plurality of film switches. More particularly, this invention relates to such switching systems for the selection of impedance combinations in two mutually isolated tone generators for push button dialing in telephone systems upon operation of a single closure switch to activate two film switches.

In many electronic circuits it is necessary or desirable to modify the operating characteristics by switching various impedances in and out of the circuits. The present invention finds application to such circuits where it is necessary or desirable to select impedance combinations in two or more mutually isolated circuits. More particularly, the invention finds application in push button dialing in telephone systems where the operating characteristics of two mutually isolated tone generators are controlled by selection of respective input filter impedance combinations.

In the prior art, it is known to select the respective impedances for each tone generator by closure of a respective switch associated with each tone generator. For the sake of economy, space saving and reliability, the present invention permits the selection of an impedance for each of the tone generators by closure of a single closure switch. The present invention utilizes the properties of film switches. These film switches are arranged so that upon closure of a single closure switch, the heater elements of a plurality of film switches are placed in series across a power supply thereby actuating the film switches to select respective impedances in the tone generators.

A film switch is an electronic device comprising a temperature-sensitive resistor formed upon a substrate as a film of resistive material extending between two terminals and having a resistivity that changes substantially when the temperature thereof goes through a transition temperature, and a heating element of electrically conductive material extending between two terminals and thermally coupled to the temperature-sensitive resistor but electrically insulated therefrom. In the film switches used in the present invention the resistance-temperature characteristic of the resistive material is such that upon application of a control signal to the heating element sufficient to heat the resistive material above its transition temperature, the resistance of the temperature-sensitive resistor decreases abruptly by at least two orders of magnitude, returning to its high resistance state upon cooling when the control signal is removed.

A group of film switches is associated with a respective tone generator. The temperature-sensitive resistors of each group of film switches are coupled to respective ones of the frequency determining elements of the respective tone generator and act to place the frequency determining elements selectively in circuit to produce different predetermined frequencies in the respective tone generator. Because the heating elements of the film switches are electrically insulated from the respective temperature-sensitive resistors, the heating elements may be connected in a single circuit while the temperature-sensitive resistors are mutually isolated. More particularly, the heating element of a film switch associated with one of the tone generators may be connected in circuit with the heating element of a film switch associated with the other tone generator without causing either tone generator to affect the other. Still more particularly, this permits the heating elements of the respective film switches to be placed in series by the operation of a single closure switch.

It is therefore an object of this invention to permit the selection of various impedance combinations of a plurality of mutually isolated circuits by the operation of a single closure switch to operate a plurality of film switches. It is a further object of this invention to select the operating frequency of each of a plurality of tone generators upon the push button operation of a single closure switch to activate respective film switches.

Other objects and advantages of the present invention will become apparent from the following detailed description, particularly when taken in conjunction with the accompanying drawings, in which.

As the present invention is dependent upon the use of film switches as generally described above, it will be helpful to have a clear understanding of such switches. Such switches are well known and may be of the sort described in "Thin-Film Switching Elements of $VO_2$" by K. van Steensel, F. van de Burg and C. Kooy, Philips Research Reports, Volume 22, pages 170–177, 1967. In such film switches, a conductive heater layer is energized to switch a film of temperature-sensitive material, such as vanadium dioxide, between relatively non-conducting and relatively conducting states. Preferably, however, the film switch is a thick film switch wherein the switch is made utilizing materials and thick film techniques like those disclosed in Amin et al. U.S. Pat. No. 3,622,523 for "Air Fireable Compositions Containing Vanadium Oxide and Boron, and Devices Therefrom."

Figure 1:
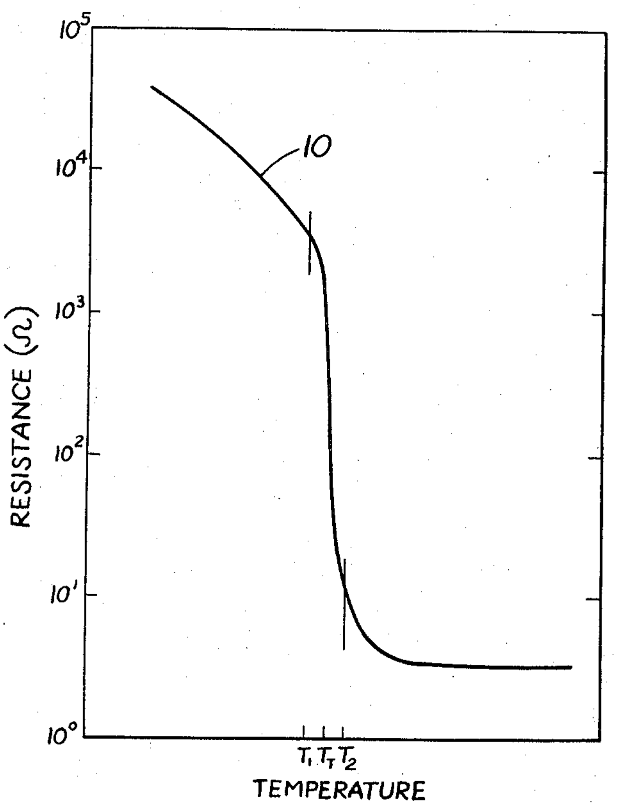
FIG. 1 is a graph representing a typical resistance-temperature characteristic of a film of resistive material in the film switches used in the present invention.

The temperature-sensitive film material may be made from air-fireable switch compositions sold under the trademark Tyox by E. I. du Pont de Nemours & Co., Inc. and described in that company's bulletin, A-81177, 4/72. Such film has a resistance-temperature characteristic 10 as shown in FIG. 1. Vanadium dioxide has a phase transition temperature $T_T$ at about 68°C. where the monoclinic structure of the low-temperature phase changes to the tetragonal rutile structure of the high-temperature phase. Such material has the property of acting as a semiconductor and displaying high resistivity below the transition temperature $T_T$ but acting as a low resistivity metal above the transition temperature. Such materials change in resistivity by a factor of $10^2$ to $10^3$ when the temperature goes through the transition temperature. The change of phase is rather abrupt. However, empirically determined curves for particular films display some deviation from sharp breaks. The transition temperature may therefore be considered as a narrow range of temperatures ($T_1$ to $T_2$ as shown in FIG. 1) through which the temperature of the film passes in going from one condition to the other. In any event, to assure prompt and complete switching, the temperatures of the films are in fact driven substantially beyond the transition temperature in each direction.

Figure 2:
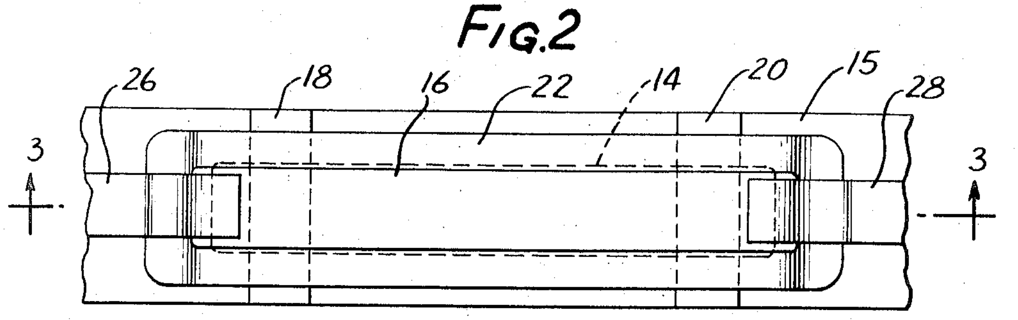
FIG. 2 is a plan view of one form of film switch used in the present invention.
Figure 3:
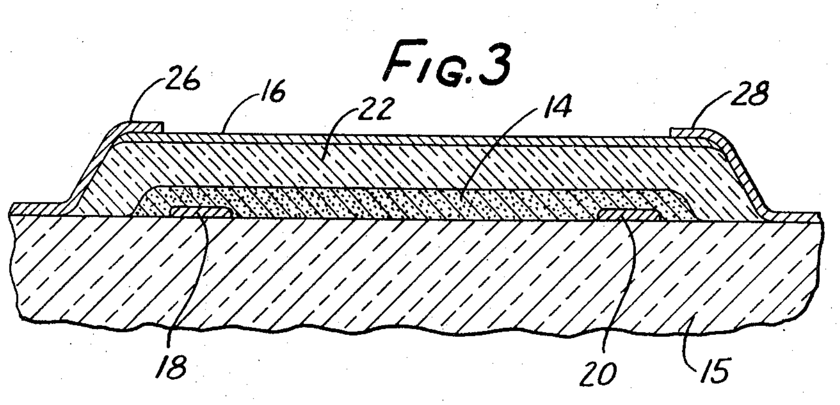
FIG. 3 is a cross-sectional view of the film switch shown in FIG. 2, taken along line 3—3 of FIG. 2.

A particular form of film switch suitable for use in the present invention is that illustrated in FIGS. 2 and 3 wherein a temperature-sensitive resistor 14 is a strip of the temperature-sensitive material formed as a relatively thick film on an insulating substrate 15. The film may be formed as described in the aforementioned U.S. Pat. No. 3,622,523 or the bulletin A-81177, wherein a paste of the special composition is printed on the substrate 15 and fired at high temperature. The particular formulation of the paste and the dimensions of the film determine its resistance characteristics. The film is made to provide the desired resistance by means well known in the art. The strip of film extends between terminals 18 and 20 which may be disposed between the temperature-sensitive resistor 14 and the substrate 15 or disposed on top of the temperature-sensitive resistor. Above the temperature-sensitive resistor 14 is an insulator 22 which also may be formed by printing and firing techniques. On top of the insulator 22 is disposed a heating element 16 which extends in a thin film between terminals 26 and 28. The film forming the heating element 16 may be formed in any well-known manner from electrically conductive material. It is of such material and dimensions as to produce a desired amount of heat upon the passage of appropriate current through it. The insulator 22 serves to insulate the heating element 16 electrically from the temperature-sensitive resistor 14 while coupling the two thermally. Passing sufficient current through the heating element 16 therefore promptly heats the temperature-sensitive resistor 14 above its transition temperature, thereby promptly reducing its resistance by at least about two orders of magnitude.

Figure 4:
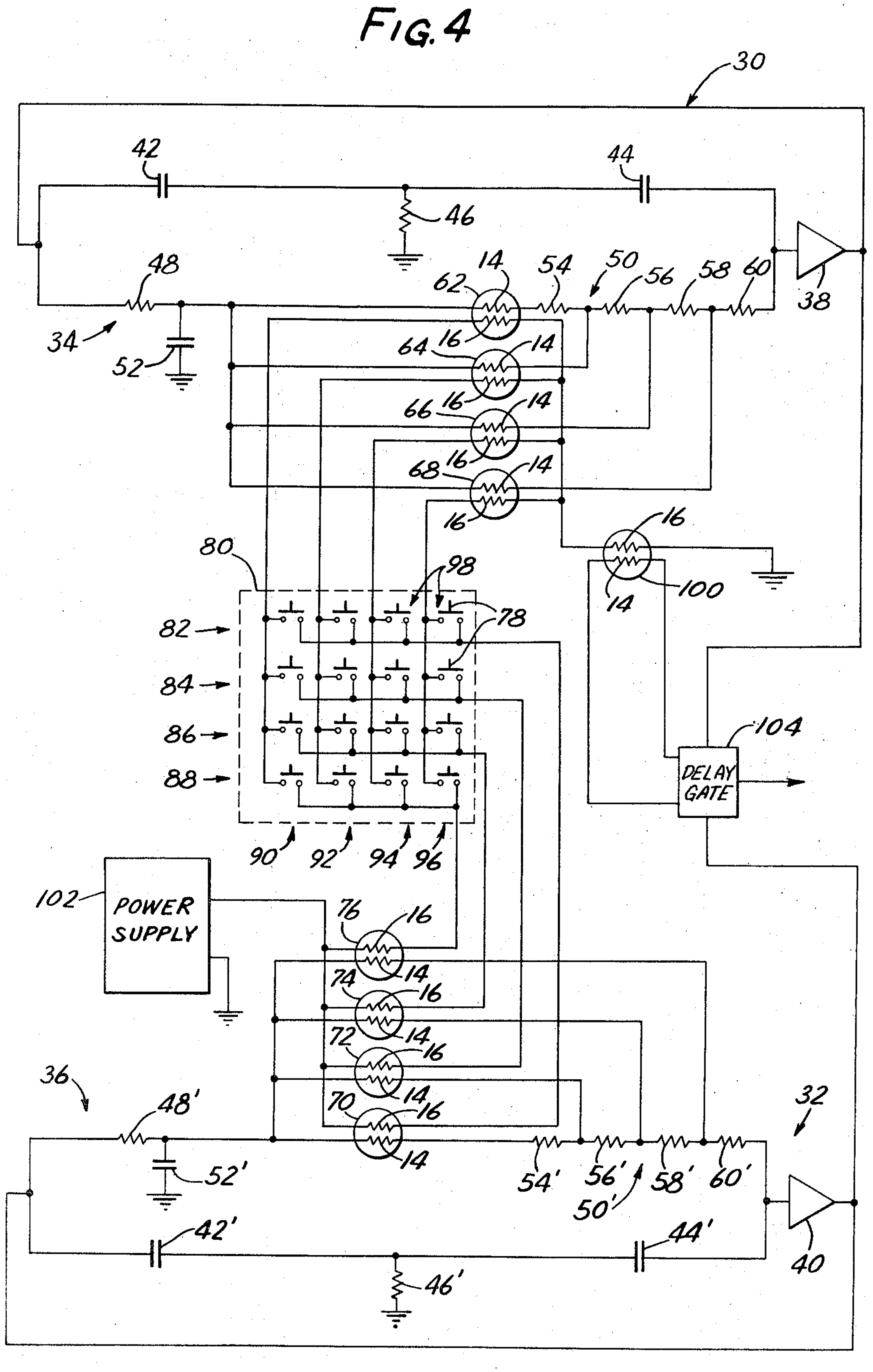
FIG. 4 is a diagrammatic illustration of one circuit utilizing the switching system of the present invention.

In FIG. 4 is illustrated a preferred embodiment of the present invention utilizing such thick-film switches to permit selection of appropriate impedance combinations in respective tone generators 30 and 32 each of which utilizes a respective twin-T filter 34, 36. Such tone generators are conventional. Basically they comprise amplifiers 38, 40 with their outputs coupled to their inputs through the respective filters. As is well known, the twin-T filter 34 comprises a high pass T section made of series capacitors 42 and 44 with the junction therebetween coupled to ground through a resistor 46. The other T section of the filter is a low-pass section formed by series connected resistor 48 and frequency determining resistive means 50 with their junction coupled to ground through a capacitor 52. The resistive means 50 is formed from a tapped series of resistors 54, 56, 58 and 60. As will be discussed in greater detail below, these resistors 54, 56, 58 and 60 are selectively placed in the filter circuit, placing different resistances in the respective arm of the filter thereby producing different particular selected predetermined frequencies at the output of the amplifier 38.

In the switching system of the present invention, the temperature-sensitive resistors 14 of respective thick-film switches 62, 64, 66 and 68 are coupled to respective resistors 54, 56, 58 and 60 to place those resistors 54, 56, 58 and 60 selectively in the circuit. More particularly, as shown, switch 62 is placed in series with the resistor 54. Switch 64 is connected to the tap between the resistors 54 and 56 in shunt of the resistor 54. Switch 66 is connected to the tap between the resistors 56 and 58 and in shunt of the resistors 54 and 56. Switch 68 is connected to the tap between the resistors 58 and 60 and in shunt of the resistors of 54, 56 and 58.

When the switches 62, 64, 66 and 68 are operated by the heating of their respective heating elements 16, the tone generator 30 produces signals at respective characteristic frequencies. In accordance with the present invention, only one of the thick-film switches 62, 64, 66 and 68 is actuated at a time; however, when it is desired to generate a tone, one of these switches is actuated. For the purposes of this explanation, the switches may be considered as either open or closed, although in point of fact it is merely that the resistance of their respective temperature-sensitive resistors 14 has changed by at least two orders of magnitude. The resistances of these temperature-sensitive resistors 14 can be made, by a manner well known in the art, of such magnitude that their resistances may be considered negligible or high compared to the resistances of the resistors 54, 56, 58 and 60, or else they may have taken into account in selecting the magnitudes of the resistors 54, 56, 58 and 60 to produce the desired frequencies. More particularly, when switch 62 is closed, and switches 64, 66 and 68 are therefore open, resistors 54, 56, 58 and 60 are connected in series in one arm of the filter, producing one characteristic frequency. When switch 64 is closed, and switches 62, 66 and 68 are therefore open, that arm of the filter consists of resistors 56, 58 and 60 in series, producing another characteristic frequency. Similarly, with switch 66 closed and the other switches open, that arm of the filter consists of resistors 58 and 60, producing a third characteristic frequency. With only switch 68 closed, resistor 60 forms that arm of the filter, producing the fourth characteristic frequency.

Similarly, the tone generator 32 includes a twin-T filter 36 formed of resistors 46', 48', 54', 56', 58' and 60' and capacitors 42', 44' and 52' corresponding to the resistors and capacitors of the filter 34 but of magnitude producing four other predetermined characteristic frequencies. As is well known and conventional, the frequencies of one tone generator are higher than the frequencies of the other tone generator, and frequencies are selected so as not to produce harmonics and other interference that might interfere with frequencies of the other tone generator. As with the filter 34, the resistors 54', 56', 58' and 60' are selectively placed in circuit by thick-film switches 70, 72, 74 and 76, connected in a manner corresponding to thick-film switches 62, 64, 66 and 68.

As is conventional in push button dialing, push buttons 78 are arranged in a rectangular array 80 in rows 82, 84, 86, 88 and columns 90, 92, 94 and 96. As shown, there may be 16 push buttons in an array of four rows and four columns as used by the military, or there may be four rows and three columns as is conventional in home and business use.

Associated with each push button 78 is a single closure switch 98 which has two contacts and is closed by depression of a respective push button 78. The single closure switches 98 are disposed beneath their respective push buttons 78 in corresponding rows and columns. The heating element 16 of the thick-film switch 62 is connected to one contact of each of the switches 98 in column 90. The heating element 16 of the thick-film switch 64 is connected to one contact of each of the switches 98 in column 92. The heating element 16 of the thick-film switch 66 is connected to one contact of each of the switches 98 in column 94. The heating element 16 of the thick-film switch 68 is connected to one contact of each of the switches 98 in column 96. The other side of each of the heating elements 16 of switches 62, 64, 66 and 68 is connected to ground, preferably, as shown, through the heating element 16 of a thick-film switch 100, the function of which will be described further below.

Similarly, the heating element 16 of the thick-film switch 70 is connected to the other contact of each of the switches 98 in row 82. The heating element 16 of the thick-film switch 72 is connected to the other contact of each of the switches 98 in row 84. The heating element 16 of the thick-film switch 74 is connected to the other contact of each of the switches 98 in row 86. The heating element 16 of the thick-film switch 76 is connected to the other contact of each of the switches 98 in row 88. The other side of each of the heating elements 16 of the switches 70, 72, 74 and 76 is connected to a power supply 102.

With the switches and push buttons 78 so connected and disposed, the depression of any push button connects one of the heating elements 16 of the group of thick-film switches 62, 64, 66 and 68 associated with one tone generator 30 in series with one of the heating elements 16 of the other group of thick-film switches 70, 72, 74 and 76 associated with the other tone generator 32. At the same time this connects the serially connected heating elements 16 between the power supply 102 and ground. The power supply 102 thereupon supplies sufficient current to the respective heating elements 16 as to cause the respective material of the respective temperature-sensitive resistors to exceed its transition temperature, thereby closing the respective thick-film switches for each of the tone generators 30 and 32. The respective tone generators thereupon produce different respective selected tones. As each of the tones for each tone generator is distinct from each of the others and depression of a single push button 78 results in a single frequency from each tone generator, the depression of a given push button 78 produces a unique combination of two tones. The two signals may be used as an indication of the depressed button and hence may be used to signal at a remote station which push button has been depressed. Thus, the depression of push buttons 78 in accordance with the usual dialing code produces corresponding signals at the remote station indicating the number dialed. Such information is used to complete the circuit to the dialed number in a conventional manner.

To assure that signals from the tone generators 32 and 34 are transmitted only when both are producing the desired frequencies, these outputs are supplied through a delay gate circuit 104 controlled by the thick-film switch 100, which may be just like the other thick-film switches. The temperature-sensitive resistor 14 of the thick-film switch 100 is connected to the delay gate to produce an enabling signal. As the heating element 16 of the thick-film switch 100 is serially connected to one side of each of the heating elements of the group of thick-film switches associated with one tone generator 30, the thick-film switch 100 is closed each time any push button 78 is depressed and hence only when the selected thick-film switch from each group is closed. Thus, an enabling signal is generated each time a selection of tones is made for the two tone generators. The delay gate 104 opens at a predetermined time after the switch 100 is closed and thereupon transmits the signals of the selected frequencies from the two tone generators 30 and 32.

Figure 5:
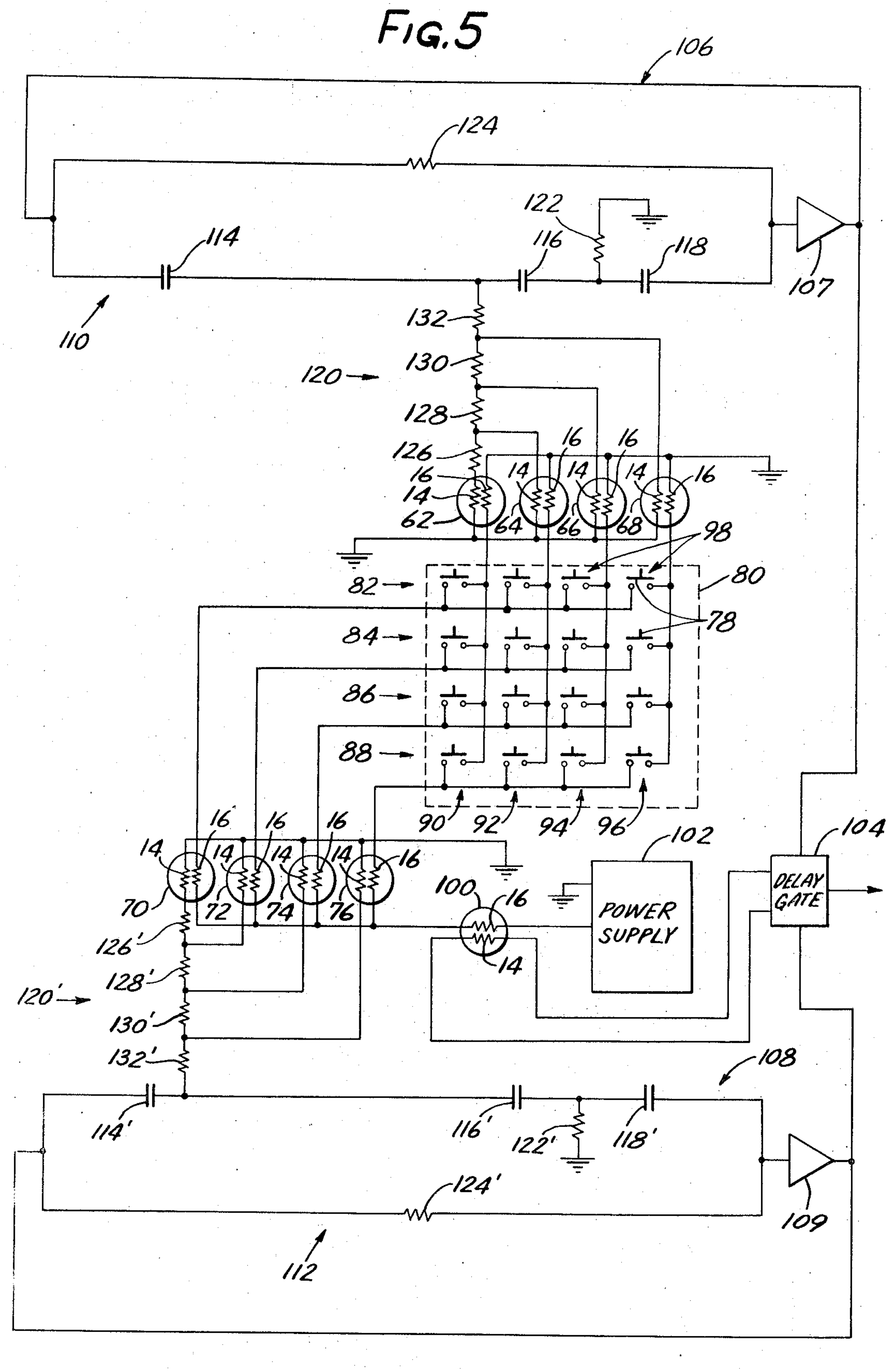
FIG. 5 is a diagrammatic illustration of another circuit utilizing the switching system of the present invention.

In FIG. 5 is illustrated an alternative circuit utilizing the same film switching system for the selection of appropriate impedance combinations in respective tone generators 106 and 108 each of which includes an amplifier 107, 109 with its output coupled to its input through a bridged pi filter 110, 112. These also are conventional tone generators. The filter 110 may comprise three serially connected capacitors 114, 116 and 118, a frequency determining resistive means 120 connected in one grounded leg of the filter from between capacitors 114 and 116, and a grounded resistor 122 connected from between capacitors 116 and 118. A bridging resistor 124 is connected across the combination of these capacitors. Like the frequency determining resistive means 50, the frequency determining resistive means 120 comprises a tapped series of resistors 126, 128, 130 and 132 which are selectively placed in the circuit by operation of the respective thick-film switches 62, 64, 66 and 68 in the same manner as resistors 54, 56, 58 and 60 were placed in the circuit of FIG. 4. Similarly, the bridged pi filter 112 is formed by corresponding capacitors 114′, 116′ and 118′, resistors 122′ and 124′, and frequency determining resistive means 120′. The resistors 126′, 128′, 130′ and 132′ are selectively placed in the circuit by operation of the thick-film switches 70, 72, 74 and 76 in a manner similar to that described above in respect to the resistors 54′, 56′, 58′ and 60′ in the circuit of FIG. 4. The array of push buttons 78 and corresponding switches 98 may be the same as used in the switching system of the circuit of FIG. 4 and function in the same way to select which of the frequency determining resistors are placed in the respective bridged pi filters. The filters may be made in a well-known manner to provide the same signal frequencies as the tone generators 30 and 32 of the circuit of FIG. 4 when the corresponding push buttons are depressed. The output signals from the tone generators 106 and 108 may be passed through the same delay gate 104 controlled by the thick-film switch 100 for the same purpose and be utilized in the same way.

Although but two switching systems utilizing the present invention have been illustrated, various modifications may be made in the circuits within the scope of the present invention. For example, both embodiments illustrated provide for the switching of resistive elements in RC filters. Other filters are possible, and other arrangements of filter elements may be used. It is also possible that more than one filter element of a given filter may be changed upon depression of a push button. Thus, several elements of one tone generator may be selected at the same time. This may be done by utilizing respective thick-film switches in parallel. It is also within the scope of the present invention to add additional tone generators utilizing additional closure switches to connect the heating elements of other respective thick-film switches in either series or parallel with the heating elements of the thick-film switches of the first and second tone generators. It is, however, an essential feature of the present invention that the heating element of a thick-film switch of one group of thick-film switches be selectively connected in series with a heating element of another group of thick-film switches. The term "series connection" as thus used includes series-parallel combinations, the important feature being that at least some of the current flowing through the heating element of one group of thick-film switches flows through at least one of the heating elements of another group of thick-film switches.

What is claimed is:

1. A switching system for simultaneously connecting selected respective impedances in a plurality of mutually isolated circuits, said switching system comprising a plurality of groups of film switches, each such film switch comprising a temperature-sensitive resistor formed as a film of resistive material extending between two terminals and having a resistivity that changes by at least about two orders of magnitude when the temperature thereof goes through a transition temperature that is substantially above ambient temperature, and a heater element of electrically conductive material extending between two terminals and thermally coupled to said film of resistive material and electrically insulated therefrom, the temperature-sensitive resistors of each group of film switches being coupled to respective ones of said impedances for a respective isolated circuit, power supply means for supplying current through said terminals of said heater elements to heat the respective films of resistive material substantially above the transition temperature of said material, and selective means for selectively connecting a heater element of one of said groups of film switches in series with a heater element of another of said groups of film switches and to said power supply means thereby placing a respective selected impedance in each of said mutually isolated circuits.

2. In a multifrequency dial signal generator for a telephone set including a plurality of tone generators, each such tone generator including a plurality of frequency determining elements, a switching system comprising a plurality of groups of film switches, each such film switch comprising a temperature-sensitive resistor formed as a film of resistive material extending between two terminals and having a resistivity that changes by at least about two orders of magnitude when the temperature thereof goes through a transition temperature that is substantially above ambient temperature, and a heater element of electrically conductive material extending between two terminals and thermally coupled to said film of resistive material and electrically insulated therefrom, the temperature-sensitive resistors of each group of film switches being coupled to respective ones of said frequency determining elements of a respective tone generator and acting to place the frequency determining elements selectively in circuit to produce different predetermined frequencies in the respective tone generator, power supply means for supplying current through said terminals of said heater elements to heat the respective films of resistive material substantially above the transition temperature of said material, and selective means for selectively connecting a heater element of one of said groups of film switches in series with a heater element of another of said groups of film switches and to said power supply means whereby said respective tone generators operate at respective selected predetermined frequencies.

3. The switching system of claim 2 wherein said selective means includes a plurality of single closure switches each operating when closed to connect a unique combination of heater elements in series whereby upon closure of each such single closure switch said tone generator operates at a unique combination of different frequencies.

4. The switching system of claim 3 including a plurality of push buttons each associated with a respective one of said single closure switches for actuation thereof.

5. The switching system of claim 2 including an output enabling gate for transmitting the outputs of said tone generators when enabled by an enabling signal, and an additional film switch like the other film switches with its heater element connected in series with the heater elements of one of said groups of film switches and with its temperature-sensitive resistor coupled to said enabling gate for producing an enabling signal therein upon closure of one of said single closure switches.

6. The switching system of claim 2 wherein the temperature-sensitive resistors of a group of film switches are coupled to respective taps on a tapped series of resistors comprising said frequency determining elements.

* * * * *